United States Patent [19]
Jacquand et al.

[11] Patent Number: 5,287,964
[45] Date of Patent: Feb. 22, 1994

[54] PACKING PROCESS, PACKING FOR PHOTOGRAPHIC WEB MATERIALS

[75] Inventors: Daniel R. Jacquand; Robert G. Bonnamour, both of Chalon sur Saone, France

[73] Assignee: Eastman Kodak Company, Rochester, N.Y.

[21] Appl. No.: 920,308

[22] PCT Filed: Feb. 4, 1991

[86] PCT No.: PCT/FR91/00074
§ 371 Date: Aug. 12, 1992
§ 102(e) Date: Aug. 12, 1992

[87] PCT Pub. No.: WO91/12561
PCT Pub. Date: Aug. 22, 1991

[30] Foreign Application Priority Data
Feb. 12, 1990 [FR] France .................... 90 01858

[51] Int. Cl.⁵ .................................. B65D 85/66
[52] U.S. Cl. ........................... 206/391; 206/398; 206/394; 206/410; 206/408; 206/455; 206/397
[58] Field of Search .............. 206/397, 455, 410, 394, 206/391, 398, 408; 242/71.1; 355/72; 354/275

[56] References Cited
U.S. PATENT DOCUMENTS
4,058,823  11/1977  Mitchel et al. .................... 206/410
5,163,556  11/1992  Akao et al. ....................... 206/394

Primary Examiner—William I. Price
Attorney, Agent, or Firm—Clyde E. Bailey

[57] ABSTRACT

The invention relates to the packing of photographic rolls. The packing comprises a base 200 adapted to the handling by lift truck, a lightproof envelope 230 and horizontal spindles 220 to receive rolls 191 provided with winding tubes 190. The diameter of the spindles varies between a first dimension where the winding tubes are rotationally and translationally immobilized and a second dimension where said winding tubes are free. Used for collective packing of photosensitive rolls.

14 Claims, 5 Drawing Sheets

5,287,964

PACKING PROCESS, PACKING FOR PHOTOGRAPHIC WEB MATERIALS

FIELD OF THE INVENTION

The invention relates to the packing of photographic web materials, and more specifically to a packing system making it possible to transport very long webs wound round tubes.

BACKGROUND OF THE INVENTION

At present, photographic paper used for printing is supplied in two different forms: either by format as individual sheets, or as rolls which are generally cut after processing. For the latter use, the rolls are of different sizes, adapted to the machines which use them.

Presentation in rolls has made it possible to increase productivity. However, the printing machines need to be installed in dark rooms, to allow the machines to be loaded, since photographic paper must be protected from light. During production, the rolls are obtained by cutting a sheet of large width, e.g. >1 m, longitudinally into individual webs having a relatively narrow width, e.g. 95 mm, 102 mm, 127 mm, or more, which are wound up. The rolls are then individually packed in lightproof sleeves, e.g. as referred to in U.S. Pat. No. 4,876,125. At the time of use, the rolls have to be removed from their packing and positioned in the machines. All these operations must be carried out in the dark, and they are time consuming.

To improve the efficiency of the machines, packing has been designed, adapted to each machine. These types of packing, known as cartridges, are described, for example in U.S. Pat. No. 4,741,439. These cartridges make for easy use of the machine, since there is no longer the need for a room which can be put into total darkness when positioning the photographic paper in the machine. However, the roll lengths are limited and, at the time of their use, it is necessary to renew the cartridges frequently and to connect the webs to one another.

To increase productivity on the machines, one method is to increase the size of the rolls. However, the weight of the rolls becomes heavy and, on account of this, it becomes tedious to handle them, both when packing and removing them from the packing. At preset, rolls of up to approximately 500 m are used. The weight of these rolls is greater than 10 kg and the diameter is wider than 40 cm.

In view of their dimensions, the rolls offer greater stability when their axis is directed vertically. However the printing machines currently available on the market use rolls whose axes are directed horizontally. One purpose of the invention is therefore to avoid having to tilt the rolls.

SUMMARY OF THE INVENTION

Recent years have seen a trend towards bipolarization of the market in photographic printing; there has been on the one hand an increase in the number of small laboratories using automatic machines, whose loading system employs the cartridges referred to above and which offer limited productivity, and on the other hand a reduction in the number of processing laboratories supplying large numbers of prints, with a considerable increase in the volume of paper for each of these laboratories.

The invention is more specifically intended for procurement for "big" laboratories using a very large volume of paper.

To increase further the productivity of these "big" laboratories, one method would be to increase the lengths of the rolls; however, the weight becomes prohibitive for manual loading, and tilting the rolls becomes troublesome.

One aim of the invention consists in supplying packing able to hold rolls of great length, measuring between approximately 500 m and 2,000 m, designed to allow easy loading of the machines, with simple and low-cost devices.

Another aim of the invention is to supply packing which requires only a little packing material and labor, so to reduce production costs.

One aim of the invention concerns reusable collective packing for photographic web materials wound round tubes so as to form rolls. In this invention, the packing consists of the following:

a) a lightproof base adapted for handling by lift truck,
b) a rigid lightproof case which can be connected to the base through lightproof means; and
c) at least one spindle located within the room delimited by the lightproof base and the case incorporating a free end adapted so as to be able to receive said rolls, with the other end fixed to said base by means of a frame, said case being connected to said base in such a way so as to enable the free end of said spindle to be freed in order to permit the introduction of roll over said spindle and said spindle lying parallel with the base and designed so that its diameter can vary between a first dimension, where said winding tubes can slide onto this spindle, and a second dimension, greater than the first, where said winding tubes are immobilized.

In one embodiment of the invention, the locking means comprises a spindle in at least two parts, so that its diameter can be varied between a first dimension, at which the spools can be slid onto this spindle, and a second dimension, greater than the first, at which the spools are immobilized.

In a preferred embodiment, the case comprises a first part secured permanently to the base and a second part which can be moved or hinged in relation to the first part, so as to allow access to the free part of the spindle(s), in order to be able to insert or remove the rolls on said spindle(s).

Advantageously, the opening provided by the second part, which can be moved in relation to the base and to the spindle, offers an external surface greater than one third of the total external surface of the case, so as to provide maximum access to said rolls inserted on the spindles.

Another aim of the invention relates to a packing process for web materials in which the webs, obtained by cutting a wide sheet into webs, are wound round tubes supported on a cutting machine spindle so as to form rolls whose width, depending on the axis, is relatively small in comparison with the diameter of said rolls. After cutting the sheet and forming the rolls, the process consists of sliding the rolls from the cutting machine spindles directly onto the collective packing spindle.

BRIEF DESCRIPTION OF THE DRAWINGS

Other purposes and advantages of this invention will appear on reading the description which follows and which is made with reference to the annexed drawings, in which.

DETAILED DESCRIPTION OF THE INVENTION

Figure 1:
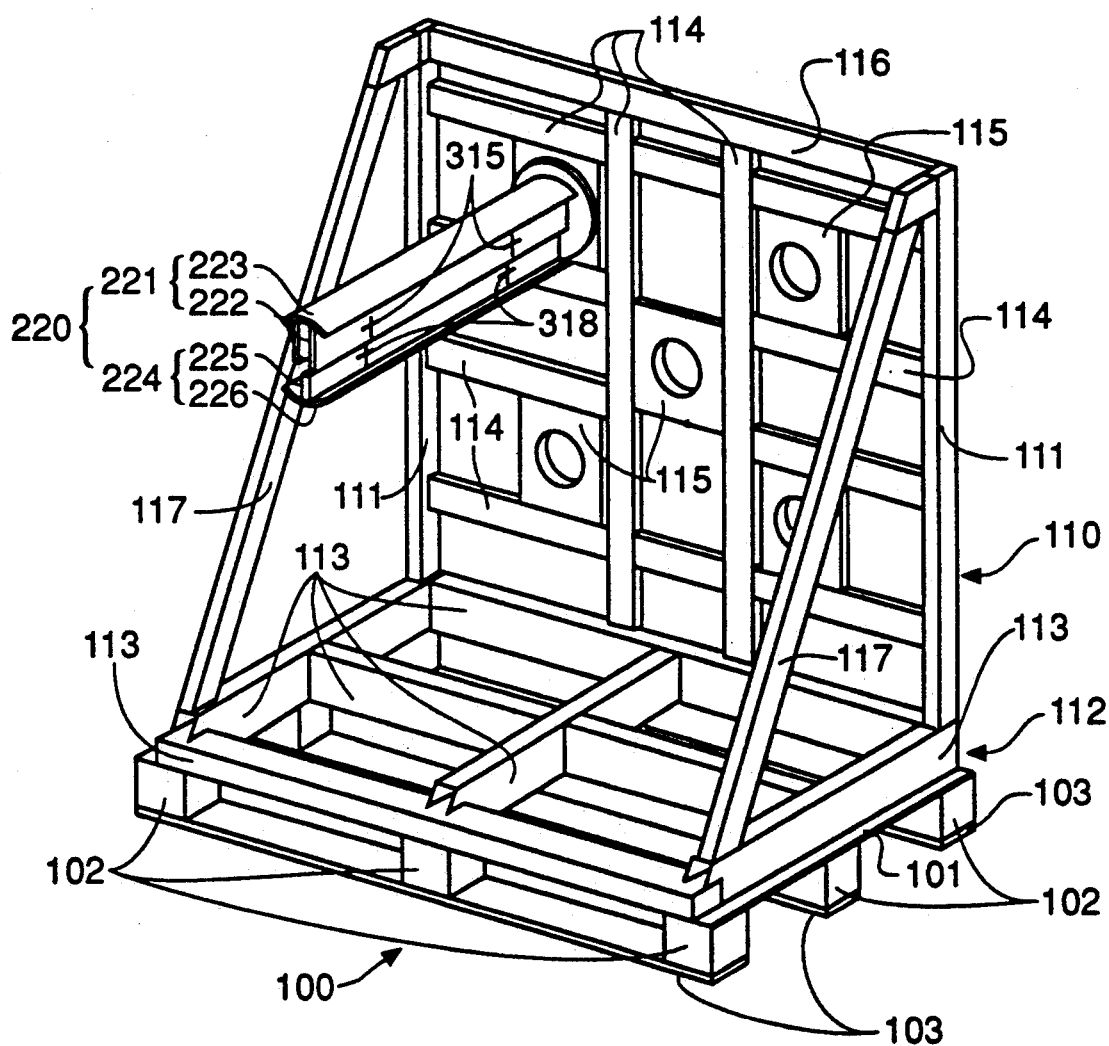
FIG. 1 schematically shows in perspective an embodiment of the device according to the invention wherein parts are not represented for clarity's sake.

For a better understanding of the invention, it is necessary to have a knowledge of the finishing stages which make it possible to obtain the photographic paper rolls.

When manufacturing photographic paper rolls, a large sheet (width greater than 1,200 mm, and length in the order of 2,000 m) is cut into relatively narrow webs (95 mm, 102 mm, 127 mm or wider) which are wound onto tubes.

Conventional cutting machines employed for manufacturing these rolls comprise an unwinding station, a cutting station and a winding station. In general, the unwinding station comprises a mechanism fitted with two pins, which make it possible for a roll of large width (greater than 1,200 mm) to be seized and for it to rotate freely around its axis. The axis of the large width roll is horizontal. The cutting station comprises a set of knives and bedknives mounted on rotating shafts and which allow the sheet, which is unwound from the large width roll, to be cut into individual, "narrow" width webs (for example, 95 mm, 102 mm, 127 mm or wider). The winding stations comprises spindles which are made to rotate and on which winding tubes are mounted. The winding tubes are made to rotate by the spindle, by means of a suitable mechanism, for example of a type such as that described in French patent 2,279,653. The axis of the shafts fitted with the knives and bedknives, the axis of the wide width roll and the axis of the winding spindles, are parallel to each other and horizontally.

Advantageously, the winding spindles on the cutting machine are mounted overhanging, i.e. they present a free end and are made to rotate by their fixed end. The free end allows easy introduction of hollow hubs onto the spindle and easy removal of the individual, "narrow" width rolls. Usually these rolls are collected for packing individually, possibly after cutting. When this operation is carried out manually, it is tedious, on account of the weight of the rolls. Furthermore, owing to their diameter of more than 400 mm and their narrow width, the stability of the rolls is greater when they are tilted, but it is necessary to tilt them back up at the time of their use on the machines. The invention offers a collective packing; this limits handling after the "narrow" width rolls have been formed.

According to the invention, the process consists of making the rolls on the spindle of the machine slide directly onto the spindle of the collective packing; this allows the rolls to remain as oriented.

According to the invention, collective packing is employed which comprises a spindle, as described in greater detail below, whose axis lies in a horizontal plane. The spindle of the collective packing is lined up with the spindle to be unloaded, and the rolls are slid onto the spindle of the packing. Advantageously, the dimension of the collective packing is such that all the rolls situated on a spindle will be transferred, in one single operation, onto the spindle of the collective packing; this will limit the packing operations to a minimum.

After transfer, the hubs are rotationally and translationally immobilized on the spindle of the packing, for example, either by increasing the external diameter of the spindle, or by locking at the end, acting on the winding tubes, or by any other suitable means.

It will be noticed that until now, on the rolls available on the market, the dimension of the winding tubes is equal to that of the cut webs. Taking into account problems of stability, the rolls are stored one on top of the other with their axis in a vertical direction; this prevents the use of winding tubes projecting beyond the side surface of the rolls. The use of winding tubes projecting beyond this side surface offers the advantage, when unloading the spindle by side movement of all the rolls, of avoiding contact between the side surfaces of the rolls. At the time of moving the rolls sideways, the rotation of the outside roll is interrupted by rubbing against the movement device. This roll is moved transversely, and then it comes into contact with the neighboring roll, whose rotation is interrupted at this moment by the contact forces between the rolls, and so on until the last roll. When the winding tubes are flush, contact is made at the edges of the webs; this risks damaging the edges of the web. Therefore, it is preferable to use winding tubes which project beyond the roll. In this case, problems of stability arise when stacking individual packing. The invention allows these problems to be overcome. Quite the contrary, with such packing, the hub projecting beyond the side surface of the rolls allows a space to be left between the rolls. This space makes for easier subsequent handling of the rolls.

Clearly the invention can also be used with cutting machines on which the spindles are not overhanging, but this complicates the unloading mechanism, since it is necessary to support the rolls in order to remove the spindle and then to introduce the rolls one at a time onto the spindle of the packing, either by moving the rolls, or by moving the packing.

In a simple embodiment according to the invention, a packing device has been designed according to the invention, as represented in FIG. 1, wherein only the frame portion has been represented.

This packing comprises essentially a horizontal base (100), in the form of a pallet, which can be handled by, for example, lift trucks. The base (100) comprises an upper lightproof floor 101 only partially represented, and means (102, 103) for spacing this floor from the ground. In the embodiment represented, the means comprise nine blocks (102) distributed along the lengths and widths of the floor, as well as in the middle. They can be connected to each other by means of a plank (103) lying in a longitudinal direction with the floor. Advantageously, the design of the base and its layout are similar to those of a European type pallet. The length of the base (100) is less than 120 cm, and its width is less than 80 cm.

Figure 2:
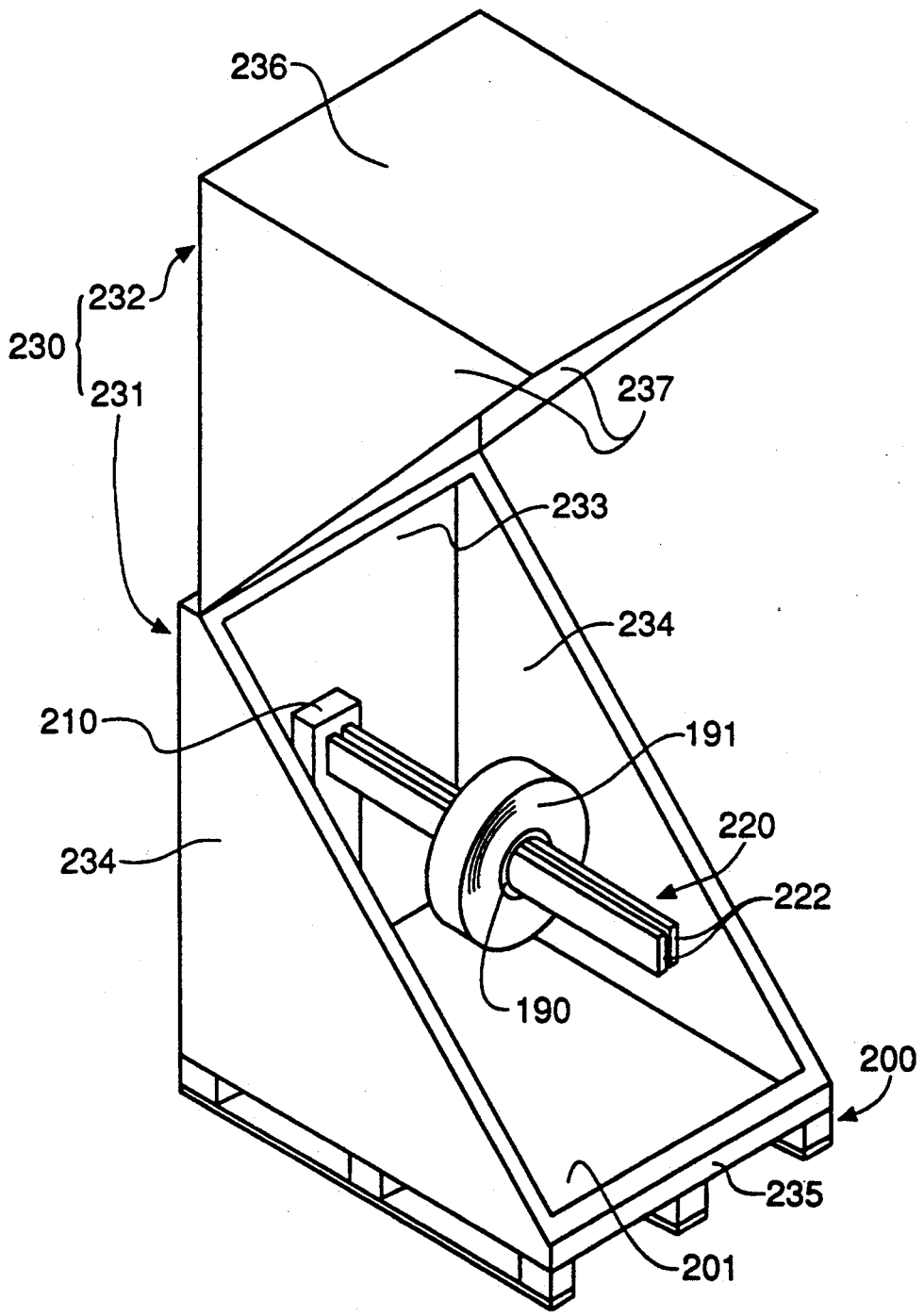
FIG. 2 schematically shows in perspective an embodiment of the packing according to the invention.
Figure 3:
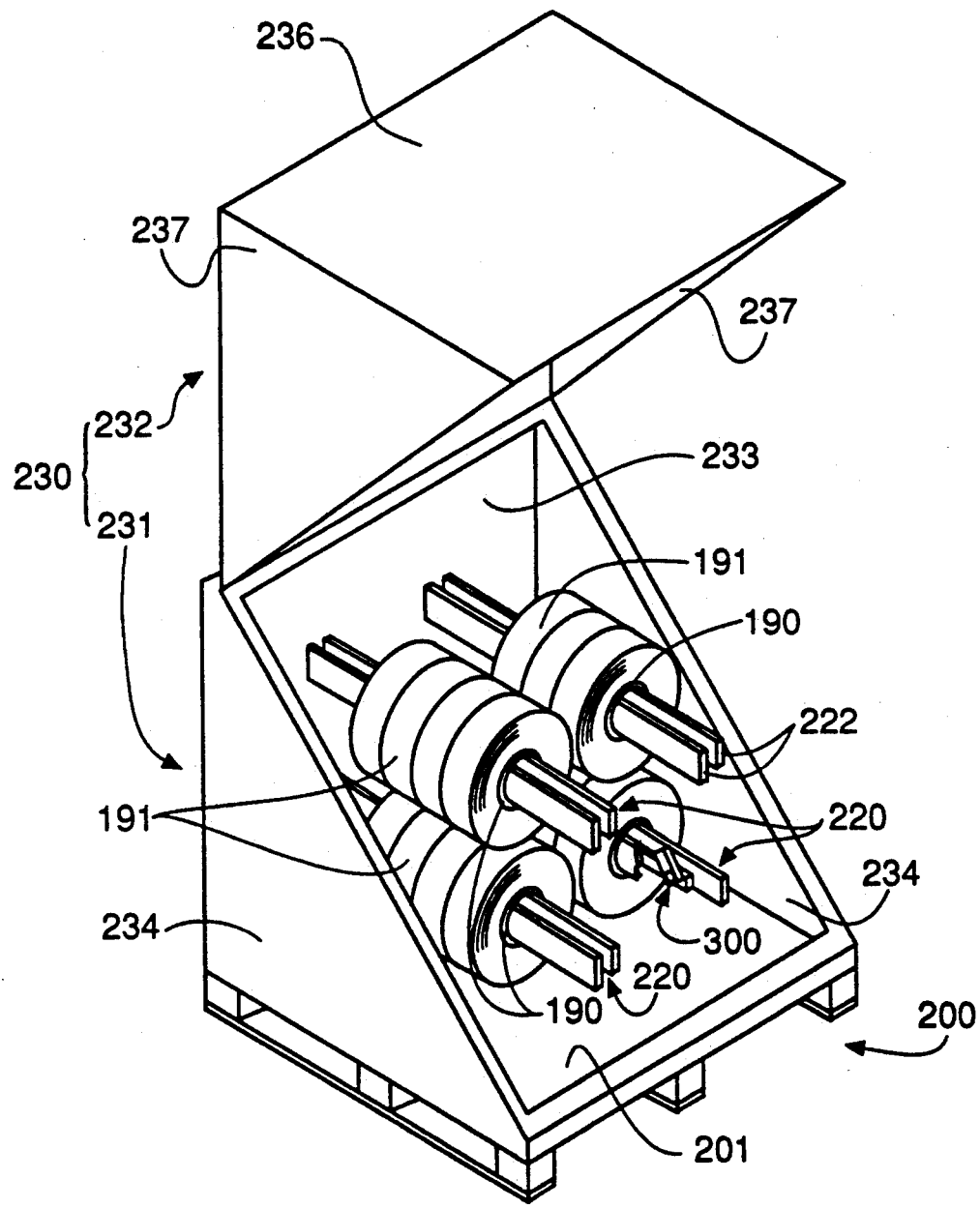
FIG. 3 represents another embodiment of the packing according to the invention with four spindles.

On one of these sides, the base is fitted with a frame (110) extending upwards. In the embodiment represented, the frame (110) comprises a horizontal subbase 112 which rests on and is fastened to the floor (101). The subbase comprises girder (113) welded to each other to form a horizontal framework. The frame also comprises vertical posts (111) connected by a crossbeam (116) and it is intended for supporting one or several spindles (220). Advantageously, the vertical posts are equipped with struts (114) forming a vertical framework on which several plates (115) are positioned for fastening the spindles. The frame (110) is stengthened by props (117). In the embodiment shown in FIG. 1, five plates are positioned so as to be able to provide, as required, either packing with one central single spindle, as represented in FIG. 2, or packing with four spindles, as represented in FIG. 3. The spindle (220) is fastened by any suitable means to one to the plates (115).

Figure 5:
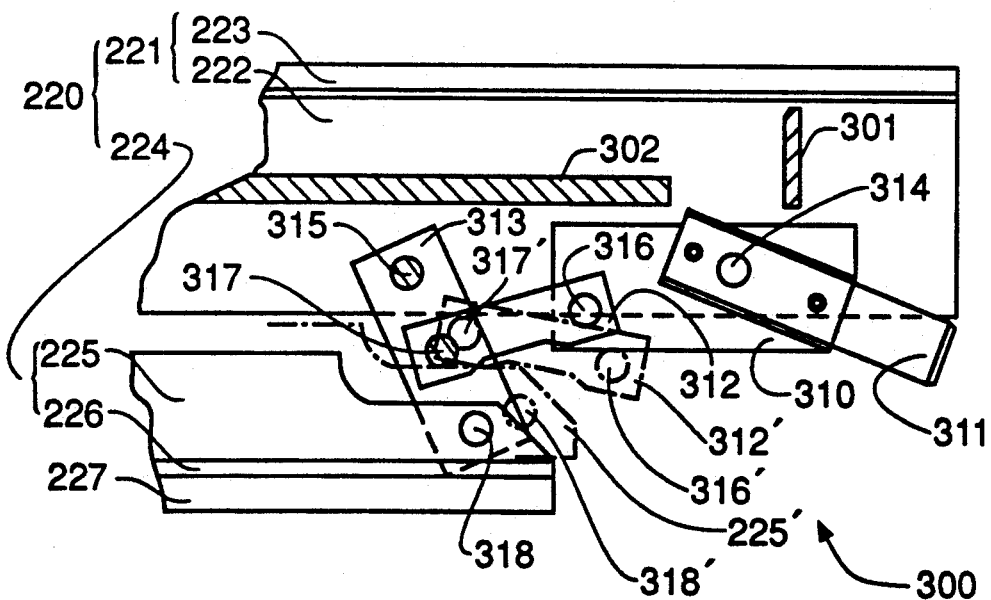
FIG. 5 represents a device with toggle joint which can be used for the spindles employed in the packing according to the invention.

As is represented in FIG. 1, the spindle (220) comprises a locking means which, in the preferred embodiment, is essentially obtained by means of a spindle in two parts: an upper part (221) and a lower part (224). The upper part forms one piece with the plate (115), and it comprises tow bars (222) and a partially cylindrical-shaped shell (223). The lower part (224) is movable in relation to the upper part (221), and it comprises a guide (225) and a shell (226). The guide (225) penetrates between the bars (222). A more detailed study, with reference to FIG. 5, is made on the device (300) for moving the lower part (224). It is simply necessary to know that this movement is instrumental in varying the external diameter of the spindle (220), so as to be able to thread winding tubes of a specific diameter onto this spindle when the diameter of the spindle is minimal, and that this spindle immobilizes the winding tube both rotationally and translationally when its diameter is at its maximum. To avoid bending the winding tubes when the diameter of the spindle is increased, the shells (223) and (226) form a partially cylindrical surface generated by rotation, and the radius of curvature is equal to the internal radius of the winding tube. Furthermore, to improve adherence between the winding tubes and the "expanded" spindle, the outer surface of the shell (226) is provided with a sheet (227) of compressible material having a high coefficient of adhesion, such as rubber (see FIG. 5). As can be seen in FIG. 1, the shells (223) and (226) need not form an almost complete cylinder generated by rotation, and it has been found that shells with cylinder portions subtended by an angle with the centre of more than 70 degrees are sufficient to immobilize the winding tube without bending it.

With reference to FIG. 2, this represents a packing system according to the invention. The packing comprises a base (200) similar to that in FIG. 1 having a floor (201). It can be moved by means of a fork-lifting device, such as, for example, the lift trucks which are well known for this purpose. The base (200), in its normal horizontal position, is fitted with a vertical frame projecting upwards. A spindle (220), shown in this figure in the form of two parallel bars (222), is fastened to the upper part of the frame (210). The axis of the spindle is parallel to the horizontal plane of the base (200).

According to the invention, the packing comprises a rigid case (230) having a first part (231) and a second part (232).

The first part (231) comprises a vertical, rear wall (233), and a vertical, front wall (235) of very small dimension, as can be seen in the figure; they are connected to each other by two side walls (234). The second part (232) consists of an upper wall (239) (see FIG. 4), a front wall (236) and two side walls (237). Obviously the case can be of any suitable shape.

In a preferred embodiment, the two parts (231) and (232) are hinged together so as to provide an opening allowing access to the free end of the spindle. In the method of embodiment represented, the opening can be described as total, since the spindle is easily accessible for an operator when loading or unloading.

It is advantageous to connect the two hinged parts by means of a suitable device, such as for example a gas spring, so as to compensate for the weight of the second part (232) at the time of opening. A locking system could be provided so as to leave the case (230) open, using the Lift-o-Stop or Hydro-Lift STABILUS registered trademark gas springs sold by S.K.F.

According to one preferred embodiment, the case comes in the form of a rectangular parallelepiped, and the case is sufficiently rigid to allow several packings to be stacked one on top of each other.

Advantageously, the packing according to the invention is used for transporting rolls (191) of photosensitive products cut into webs and wound round tubes (190). In this case, the casing must provide a lightproof enclosure for the rolls (191). The connection between the base (200) and the case must be lightproof. If the case does not form one piece with the base, lightproofing can be provided by means of such double baffles as are described below. If the case comprises two parts, as is shown in FIG. 2 for example, the base (200) incorporate a floor (201) having a continuous upper surface which is impervious to light; the first part and the second part of the case are constructed from material impervious to light, and the connection between the two parts is obtained by means of baffles, similar to those represented in FIG. 4.

Figure 4:
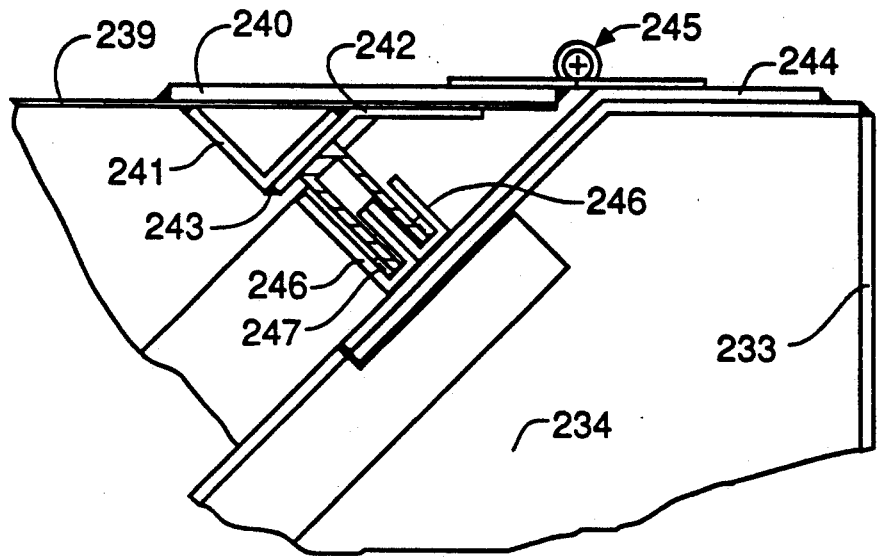
FIG. 4 represents a detail of the possible hinging for the packing according to the invention.

With reference to FIG. 4, this sets out a diagram of a possible method of hinging the two parts of the case, as well as a method for using baffles to provide lightproofing.

The upper wall (239) of the second part incorporates a reinforcement (240) combined with an L-shaped angle iron (241) and a joining element (242) A U-shaped staple (243) is fastened to the element (242) and to the angle iron (241) by any suitable means such as, for example, bolts or welding. The upper portion of the first part (231) of the case is fitted with a reinforcing piece (244). A hinge (245) is fastened to the reinforcing piece (244) and to the reinforcement (240) so that the second part (232) of the case (230) can swing on the first part (231) of this case. Regarding the staple (243), two U-shaped rails (246) are fastened which each cooperate with one of the wings of the staple (243). Thus, a double baffle is obtained which provides lightproofing. It is obvious that the lengths and widths of the rails (246) and of the staples (243) are adapted to allow cooperation between these elements. It is obvious that the entire circumference, around the first and second parts, is equipped with a flexible material (247) such as, for example, cellular plastic foam, which cooperates with the end of the wings of the staple (243) in order to provide improved lightproofing.

FIG. 3 shows another method of realization. The same reference numbers have been used for the corresponding elements. In this method of realization, the packing is fitted with four spindles (220) which are schematized, as shown in FIG. 2, by two parallel bars (222). In this figure, one of the bars has been partly omitted, allowing a part of the device (300) to be seen which is used to vary the external diameter of the spindle; this is described in greater detail below. Furthermore, the diagram has been simplified for an understanding of the drawing and it does not show the frame (210).

With reference to FIG. 5, a description is now given the device (300) which enables the external diameter of the spindle (200) to be varied.

As indicated above, the rail (225) is movable in relation to the bars (222). To this end, the rail (225) is connected to the bars (222) by means of two pieces (313) which are hinged and positioned close to each of the ends of the spindle see FIG. 1. The pieces (313) are hinged at (315) on the bars (222) and at (318) on the rail (225) so as to form a flexible parallelogram. The two axis (315) are fixed in relation to the spindle (220). The movement of the pieces (313) is controlled by means of a toggle joint device (300). The toggle joint hinge consists of a device (310) hinged on the bars (222) at (314) and an element (312) hinged at one end at (317) to the piece (313) and at the other end (316) to the device (310). The device incorporates a control screw (311) which makes it possible to tilt the device on the axis (314). The spindle (220) is provided with limit stops (301) and (302) limiting the extent of the tilting of the device (310). As can be seen on the drawing, if the device (310) is tilted anticlockwise (FIG. 5), this causes the axis (316) to move downwards to position (316)' At the same time, element (312) moves to position (312') (represented by the chain-dotted line in FIG. 5). This causes the articulation axis (317) to move towards the right, see FIG. 5, to position (317'), which also causes the axis (318) to move towards the right and upwards, reaching (318'), and it and moves the rail (225) upwards to (225'), in the position represented by the chain-dotted line in FIG. 5. When the device (310) is tilted again clockwise, see FIG. 5, the various mechanical parts resume their initial position, and then the device comes to rest on the limit stop (302) after the axis (316) has passed the balanced position represented in FIG. 5, in which axis (314), (316) and (317) are aligned. In this position, the external diameter of the spindle is greater than the diameter of the spindle when the rail is in position (225'), and it immobilizes at the same time rotationally and translationally any winding tube positioned on the spindle (220).

In a preferred embodiment of the packing according to the invention, a cover (400), which is lightproof, is used to receive the individual rolls held on each spindle. This cover offers two advantages. Firstly, it provides protection against humidity, since the wall of the rigid case is subject to wide temperature variations, causing under certain conditions the formation of condensation on the upper wall, with the risk of drops of water falling on the surface of the paper. A cover makes it possible to reduce considerably the volume of air confined; this reduces condensation proportionally. The second advantage applies only to collective packing which incorporates several spindles. The cover is an additional protection which prevents damage to all the rolls, if, inadvertently, the premises is not in darkness when the collective packing is opened in order to remove a roll of paper.

Figure 6:
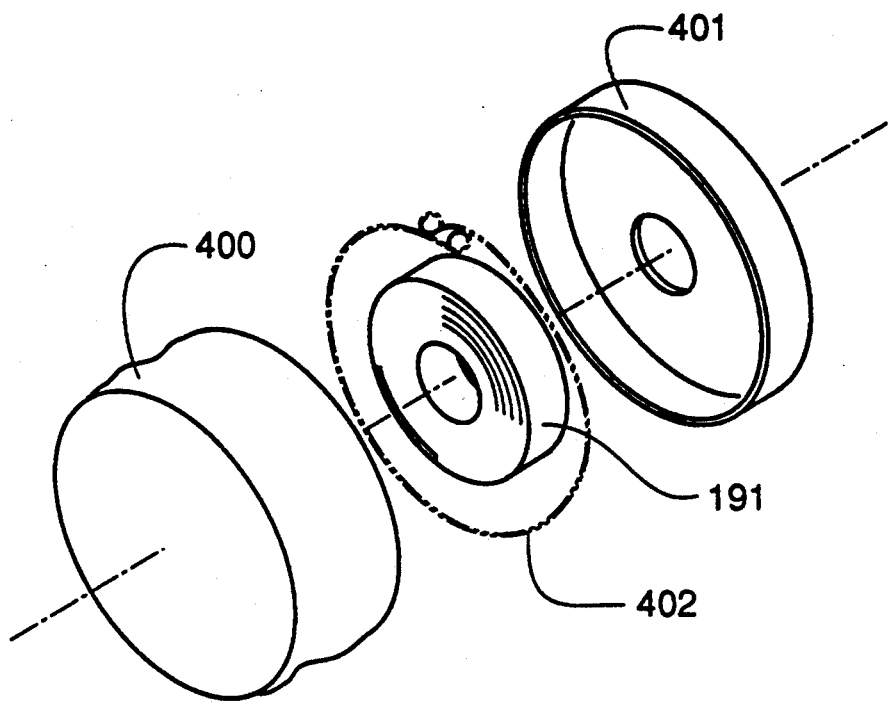
FIG. 6 represents schematically and exploded view of an additional improvement to the invention.

FIG. 6 describes a possible embodiment for fastening the cover in a practically lightproof manner.

The rear wall is fitted with a built on sleeve (401) forming a cylindrical surface generated by rotation on which the cover rests. The internal diameter of this cheek is slightly greater than the external diameter of the rolls received by the packing, so as not to hinder the stacking of the rolls.

Figure 7:
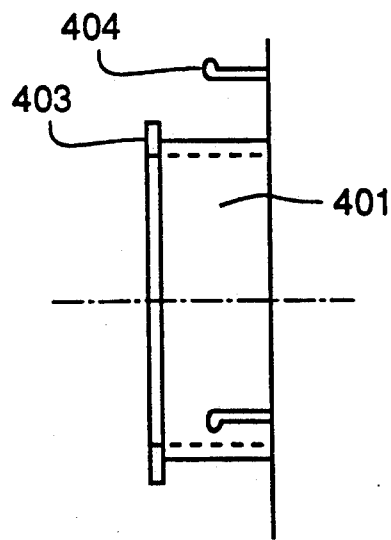
FIG. 7 schematically represents an advantageous embodiment of FIG. 6.

The cover (400) is fastened to the sleeve (401) by means of, for example, an elastic retainer ring (402) similar to that represented in FIG. 6. it is obvious that improved lightproofing is obtained if the edge of the sleeve (401) furthest from the wall of the case (230) incorporates an excluder (403) as represented in FIG. 7. In addition, provision can be made for three pins (404), situated at 120 degrees, to act as supports for the elastic retained ring (402) when the cover is not in position.

The cover described above is flexible; however, it is obvious that it can be replaced by a rigid guard which is placed over the rolls. The guard may be fastened to the bottom of the case (230) by, for example, a bayonet system.

It is obvious that if the conditions or the types of products to be packed so require, the case (230) may be thermally insulated or even incorporate a thermostat.

We claim:

1. Reusable collective packing for photographic materials wound round tubes so as to form rolls having at least one hub member comprising:
    a) a lightproof base adapted for handling by lift truck,
    b) a rigid lightproof case which can be connected to the base through lightproof means; and
    c) at least one spindle located within the room delimited by the lightproof base and the case incorporating a free end adapted so as to be able to receive said rolls, with the other end fixed to said base by means of a frame, said case being connected to said base in such a way so as to enable the free end of said spindle to be freed in order to permit the introduction of roll over said spindle and said spindle lying parallel with the base and including locking means to vary the diameter between a first dimension, where said winding tubes can slide onto this spindle, and a second dimension, greater than the first, where said winding tubes are immobilized.

2. Packing according to claim 1 in which the dimension of the hub is such that it projects beyond the rolls.

3. Packing according to claim 2 in which the case comprises a first part connected permanently to the base and a second part which can be moved in relation to the first part, such as to provide access to the free end of the spindles for the purpose of inserting or removing the rolls on said spindles.

4. Packing according to claim 3 in which the second part of the case is hinged to the first part.

5. Packing according to claim 4, in which the surface of the second part is greater than one third of the total surface of the case.

6. Packing according to claim 2, in which the locking means for the spindle comprises a spindle in at least two parts, such that its diameter can vary between a first dimension, where said winding tubes can slide onto this spindle and a second dimension, greater than the first, where said winding tubes are immobilized.

7. Packing according to claim 6 in which the spindle comprises a shell covering at least in part the axis of the spindle and formed of at least two parts, each incorporating a portion of almost cylindrical surface generated by rotation, on which the rolls are positioned, and a device to separate and bring together the two parts in relation to each other.

8. Packing according to claim 7 in which the shell comprises two parts, characterized by the fact that each portion of the almost cylindrical surface is subtended by a minimum angle of 70 degrees.

9. Packing according to claim 7, in which the device comprises a toggle joint device to hold the two parts in their separated position when the rolls are positioned on the spindle.

10. Packing according to claim 5, in which the case is fitted with a fastening means for securing to the wall of this rigid case a cover enclosing means for covering the rolls positioned on the spindle.

11. Packing process for web materials in which webs, obtained by cutting large width sheets into webs, are wound round tubes held on a cutting machine spindle so as to form rolls; after cutting the sheet and forming the rolls, this process consists of sliding the rolls from the cutting machine spindle directly onto the spindle of a collective packing system.

12. Process according to claim 11 comprising the additional operation for immobilizing the winding tubes on the spindle.

13. Reusable collective packing for photographic web materials wound round tubes so as to form rolls, comprising:
  a) a base having a primary surface and adapted for handling by lift truck,
  b) a lightproof case which can be connected to the base,
  c) means for supporting, inside the case several rolls of photographic material so that the axis of said several rolls are substantially parallel to said primary surface of said base.

14. Packing according to claim 13 wherein means to immobilize the rolls are provided.

* * * * *